(12) United States Patent
Aliakseyeu et al.

(10) Patent No.: US 10,420,182 B2
(45) Date of Patent: Sep. 17, 2019

(54) AUTOMATICALLY COMMISSIONING A GROUP OF LIGHTING UNITS

(71) Applicant: SIGNIFY HOLDING B.V., Eindhoven (NL)

(72) Inventors: Dzmitry Viktorovich Aliakseyeu, Eindhoven (NL); Ramon Antoine Wiro Clout, Eindhoven (NL); Tatiana Aleksandrovna Lashina, Eindhoven (NL); Bartel Marinus Van De Sluis, Eindhoven (NL); Tim Dekker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/321,890

(22) PCT Filed: Jun. 10, 2015

(86) PCT No.: PCT/IB2015/054376
§ 371 (c)(1),
(2) Date: Dec. 23, 2016

(87) PCT Pub. No.: WO2015/198181
PCT Pub. Date: Dec. 30, 2015

(65) Prior Publication Data
US 2017/0135174 A1 May 11, 2017

Related U.S. Application Data

(60) Provisional application No. 62/017,500, filed on Jun. 26, 2014.

(51) Int. Cl.
*H05B 33/08* (2006.01)
*H05B 37/02* (2006.01)

(52) U.S. Cl.
CPC ..... *H05B 33/0854* (2013.01); *H05B 37/0245* (2013.01); *H05B 37/0272* (2013.01); *H05B 37/0281* (2013.01)

(58) Field of Classification Search
CPC .................. H05B 37/0272; H05B 37/0281
See application file for complete search history.

(56) References Cited

U.S. PATENT DOCUMENTS 6,016,038 A 1/2000 Mueller et al.
6,211,626 B1 4/2001 Lys et al.
(Continued)

FOREIGN PATENT DOCUMENTS

JP 2012505518 A 3/2012
WO 2007132382 A2 11/2007
(Continued)

*Primary Examiner* — Seokjin Kim
(74) *Attorney, Agent, or Firm* — Meenakshy Chakravorty

(57) ABSTRACT

Systems, methods and computer-readable media are described herein for commissioning a group of two or more lighting units (102) as a group. In various embodiments, the group may be commissioned based at least in part on the two or more lighting units emitting light having corresponding properties. Additionally or alternatively, in various embodiments, the group may be commissioned based on the two or more lighting units being influenced by sensor events raised by two or more sensors (110) within a predetermined time interval. The two or more sensors may take a variety of forms, including but not limited to a presence sensor, an accelerometer, a sensor configured to detect a signal from a third party network service, and so forth.

20 Claims, 4 Drawing Sheets

(56) References Cited

U.S. PATENT DOCUMENTS

| | | | |
|---|---|---|---|
| 6,781,329 B2 | 8/2004 | Mueller | |
| 9,386,662 B1* | 7/2016 | Hoddie | H05B 37/0227 |
| 2011/0031897 A1* | 2/2011 | Henig | H05B 37/0254 |
| | | | 315/297 |
| 2011/0199004 A1 | 8/2011 | Henig et al. | |
| 2012/0091895 A1* | 4/2012 | De Groot | H05B 37/0227 |
| | | | 315/130 |
| 2013/0221858 A1 | 4/2013 | Silberstein | |
| 2013/0293149 A1* | 11/2013 | Stockburger | H05B 37/0227 |
| | | | 315/297 |
| 2014/0168610 A1 | 6/2014 | Spaulding et al. | |
| 2015/0103515 A1* | 4/2015 | Bosua | F21V 29/83 |
| | | | 362/157 |
| 2015/0108901 A1* | 4/2015 | Greene | H05B 37/0218 |
| | | | 315/149 |
| 2016/0374182 A1* | 12/2016 | Newton | H05B 37/0272 |
| 2017/0105265 A1* | 4/2017 | Sadwick | A61N 5/0618 |

FOREIGN PATENT DOCUMENTS

| | | |
|---|---|---|
| WO | 2010100576 A1 | 9/2010 |
| WO | 2010100586 A2 | 9/2010 |
| WO | 2011055259 A1 | 5/2011 |
| WO | 2012151678 A1 | 11/2012 |
| WO | 2013061189 A1 | 5/2013 |
| WO | 2014001965 A1 | 1/2014 |
| WO | 2014060897 A1 | 4/2014 |

* cited by examiner

AUTOMATICALLY COMMISSIONING A GROUP OF LIGHTING UNITS

CROSS-REFERENCE TO PRIOR APPLICATIONS

This application is the U.S. National Phase application under 35 U.S.C. § 371 of International Application No. PCT/IB2015/054376, filed on Jun. 10, 2015, which claims the benefit of U.S. Patent Application No. 62/017,500, filed on Jun. 26, 2014. These applications are hereby incorporated by reference herein.

CROSS-REFERENCE TO RELATED APPLICATIONS

This utility application claims priority to and benefit from provisional application having U.S. Patent Application Ser. No. 61/017,500, titled "AUTOMATICALLY COMMISSIONING A GROUP OF LIGHTING UNITS" and having filing date Jun. 26, 2014, all of which is incorporated by reference herein.

TECHNICAL FIELD

The present invention is directed generally to lighting control. More particularly, various inventive methods and apparatus disclosed herein relate to commissioning two or more lighting units as a group based on various detected events and/or stimuli.

BACKGROUND

Digital lighting technologies, i.e., illumination based on semiconductor light sources, such as light-emitting diodes ("LEDs"), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Manually grouping lighting units into groups may be useful but tedious. Existing mechanisms are simple enough to use if the number of lighting units is small and/or unlikely to change over time. However, in situations where a potentially large number of lighting units may be logically grouped, e.g., on a chandelier or in a large area of a home or business, then manually grouping lighting units may be cumbersome, especially where some units must be replaced as time passes.

SUMMARY

The present disclosure is directed to inventive methods and apparatus for automatically commissioning two or more lighting units as a group. For example, a network node such as a lighting system controller or bridge may receive, within a predetermined time interval, two or more sensor events from various types of sensors. These sensor events may be meant to cause energizing of two or more lighting units associated with the sensors. The network node may commission (or propose commission of) a logical group of light sources that are energized as a result of the sensor events.

Generally, in one aspect, a lighting system controller may be configured to control a plurality of lighting units of a lighting system, and may include logic such as one or more processors, a communication interface operably coupled with the logic, and memory. The logic may be configured to: determine a time interval for commissioning a group of two or more lighting units of the plurality of lighting units of the lighting system; receive, via the communication interface within an iteration of the time interval, from two or more sensors associated with the lighting system, indications of two or more sensor events; and commission the group of two or more lighting units to include two or more lighting units of the lighting system, each influenced by at least one of the two or more sensor events.

In various embodiments, the time interval is a user-selected time interval received from a computing device operated by a user. In various embodiments, the lighting system controller may further be configured to assign a group address to the group of two or more lighting units. In various embodiments, at least one of the two or more sensors associated with the lighting system is integral with a particular lighting unit of the lighting system. In various embodiments, at least one of the two or more sensors associated with the lighting system is a presence sensor. In various embodiments, at least one of the two or more sensors associated with the lighting system is an accelerometer or gyroscope configured to detect force applied to, or movement of, a luminaire or lighting unit. In various embodiments, at least one of the two or more sensors associated with the lighting system is a capacitive sensor configured to detect touch of a luminaire.

In various embodiments, at least one of the two or more sensors associated with the lighting system is configured to sense a signal from a third party network service. In various versions, the signal from the third party network service comprises an event occurring on a social network. In various versions, the signal from the third party network service comprises an update from a news service, a weather service, or a sports reporting service.

In various embodiments, the lighting system controller may be further configured to commission the group of two or more lighting units to include two or more lighting units of the lighting system, each influenced by at least one of the two or more sensor events, that also are configured to output light having corresponding properties. In various embodiments, the lighting system controller may be further configured to provide, via the communication interface to a mobile computing device, data configured to cause the mobile computing device to render output prompting a user to accept, reject, or further modify the group of two or more lighting units.

In another aspect, a method may include: determining, by a network node associated with a lighting system, a time interval for commissioning a group of two or more lighting units of a plurality of lighting units associated with the lighting system; determining, by the network node, one or more properties of light emitted by each of two or more lighting units of the lighting system; and commissioning, by the network node, a group of two or more lighting units to include two or more lighting units of the lighting system that: are configured to output light having corresponding properties; and provided identifiers to the network node within an iteration of the time interval, or are influenced by sensor events raised by two or more sensors associated with the lighting system within the iteration of the time interval.

In another aspect, a method may include: receiving, from a mobile computing device, an instruction to begin commissioning a group of two or more lighting units from a plurality of lighting units; receiving, from two or more lighting units of the plurality of lighting units, indications that the lighting units have been energized; receiving, from the mobile computing device, an instruction to cease commissioning the group of two or more lighting units; and assigning a group address to the two or more energized lighting units.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Manually grouping lighting units into groups may be useful but tedious. Existing mechanisms are simple enough to use if the number of lighting units is small and/or unlikely to change over time. However, in situations where a potentially large number of lighting units may be logically grouped, e.g., on a chandelier or in a large area of a home or business, then manually grouping lighting units may be cumbersome, especially where some units must be replaced as time passes. Accordingly, the Applicants have recognized that it would be beneficial to automatically group lighting units with minimal user intervention. In various embodiments, a time interval may be determined for commissioning a group of two or more lighting units of a plurality of lighting units of a lighting system. Indications of two or more sensor events may be received, from two or more sensors associated with the lighting system, within an iteration of the time interval. A group may be commissioned to include two or more lighting units of the lighting system, each influenced by at least one of the two or more sensor events.

Figure 1:
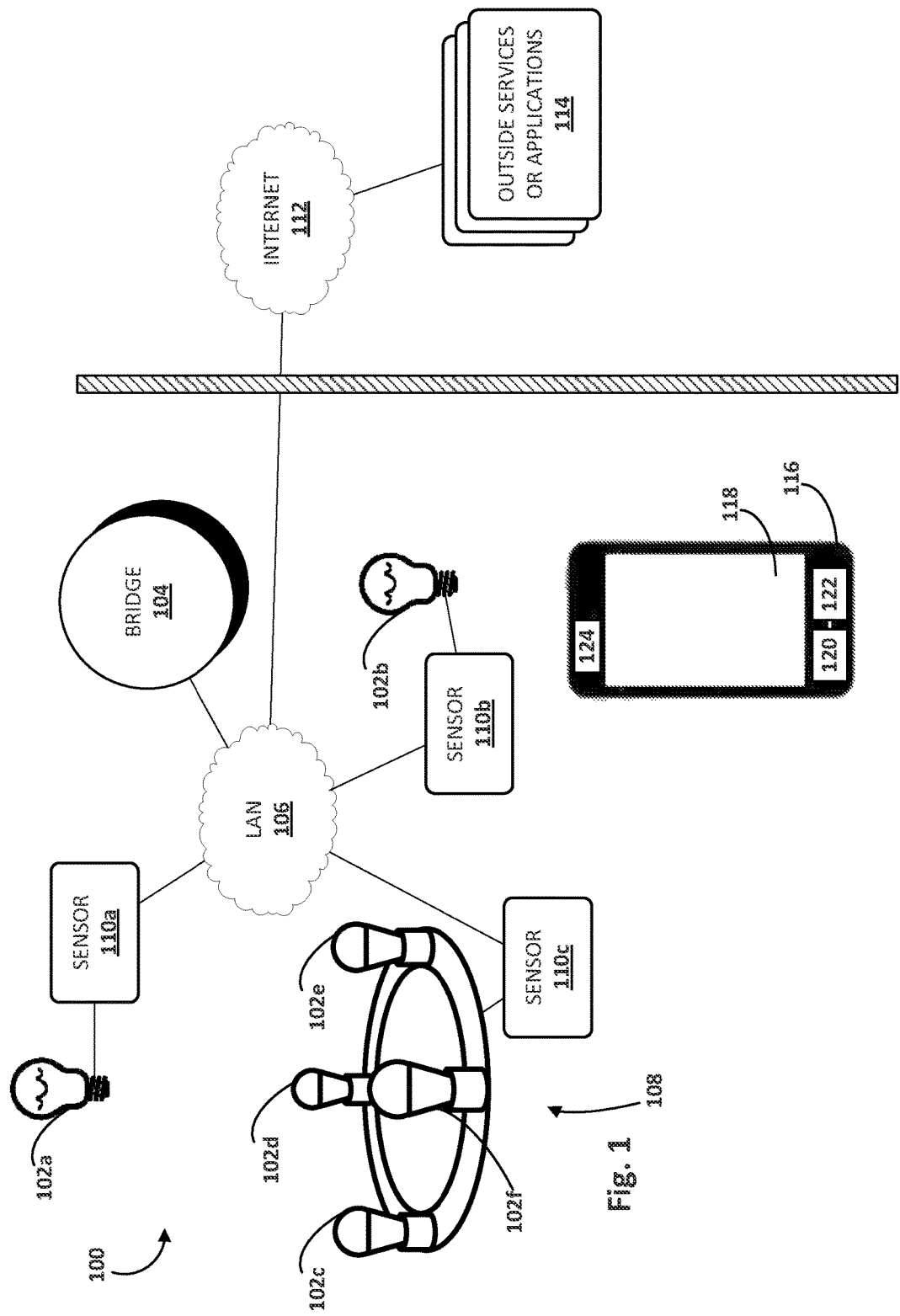
FIG. 1 illustrates an example environment in which disclosed techniques may be implemented, in accordance with various embodiments.

Referring to FIG. 1, in one embodiment, a lighting system 100 may include one or more lighting units 102*a-f*. Lighting units 102*a-f*, which may be referred to generically as "lighting units 102," may come in various forms and may employ various types of light sources, such as incandescent, LED, fluorescent, halogen, and so forth. Lighting units 102*a-f* (and/or "smart" luminaires in which they are installed) may be in communication with various network nodes that may act as lighting system controllers, such as a lighting system bridge 104, over one or more networks, such as local area network ("LAN") 106. In various embodiments, in addition to or instead of LAN 106, one or more lighting units 102*a-f* may be in communication with lighting system bridge 104 using various other wired and wireless network technologies, including but not limited to one or more ad hoc networks such as ZigBee, BlueTooth, Wi-Fi (including Wi-Fi Direct), near field communication ("NFC"), and so forth. While not depicted in FIG. 1, in various embodiments, a lighting system controller such as lighting system bridge 104 may include logic such as one or more processors, one or more communication interfaces, memory storing instructions that may be executed by the logic, and other standard computing components.

First lighting unit 102*a* and second lighting unit 102*b* are standalone lighting units installed in, for instance, standalone lighting fixtures such as lamps, hanging lamps, and so forth. The remaining lighting units 102*c-f* are installed together in a multi-unit luminaire 108. Luminaire 108 may come in a variety of form factors, and may include more or less lighting units than are depicted in FIG. 1. For example, in some embodiments, luminaire 108 may be a chandelier that includes dozens or more sockets to receive lighting units.

One or more lighting units 102 may be in communication with, and in some cases may be integral with, one or more sensors 110*a-c* (referred to generically as "sensors 110"). Sensors 110 may come in various forms. In some embodiments, one or more sensors 110 may employ various presence-sensing techniques, including but not limited to passive infrared, ultrasonic, microwave, and/or tomographic motion detection, to sense the presence or people or objects. In some embodiments, one or more sensors 110 may be configured to detect touch and/or force applied to, or movement of, a one or more lighting units 102 and/or luminaire 108, and may include accelerometers, gyroscopes, capacitive touch sensors, and so forth. In some embodiments, one or more sensors 110 may take other forms, including but not limited to thermometers, barometers, light sensors (e.g., photodiodes, LED as light sensors, colorimeters, etc.), sound sensors (e.g., "clap" sensors), and so forth.

In various embodiments, signals or indications from sensors 110, also referred to as "sensor events," may cause corresponding lighting units 102 to energize, de-energize, or otherwise alter their light output. For example, first sensor 110*a* and second sensor 110*b* may be presence sensors configured to raise sensor events that, when sensed by first lighting unit 102*a* and second lighting unit 102*b*, respectively, toggle those lighting units between energized and de-energized. Third sensor 110*c* may also be a presence sensor, but may instead be configured to raise a sensor event that is sensed by all the lighting units 102*c-f* of luminaire, so that all those lighting units energize or de-energize (or otherwise alter light output) in a uniform manner. Although examples referred to herein will describe primarily presence sensors, this is not meant to be limiting. Any of the other types of sensors mentioned previously or other unmentioned sensors may be employed as well.

One or more outside services and/or applications 114 may also raise sensor events that may cause one or more lighting units 102 to energize, de-energize or otherwise alter its light output. Outside services and/or applications 114 may communicate with a lighting system controller such as lighting system bridge 104 through one or more networks, including but not limited to the Internet 112, to which LAN 106 may be connected (e.g., through a modem). Operation of lighting system bridge 104 and/or one or more lighting units 102 may be associated with outside services and/or applications 114 in various ways. In some embodiments, connection technology such as If This Then That, or "IFTTT," may be employed to connect events in the outside world to light output of one or more lighting units 102.

Outside services and/or applications 114 may come in various forms. One example is a social networking service. A social networking service, or simply "social network," may provide sensor events in various forms that may influence light output of one or more lighting units 102. For example, incoming or outgoing social network messages, friend requests, event invites, wall postings, status changes, picture uploads—lighting system bridge 104 and/or lighting units 102 may be configured to take these sensor events into account when selecting one or more properties of light to be emitted by one or more lighting units 102.

Another example of outside services and/or applications 114 may be a web service. Lighting system bridge 104 and/or one or more lighting units 102 may be configured to communicate with one or more web services using various communication technologies and/or methodologies, such as Simple Object Access Protocol ("SOAP"), Web Services Description Language ("WSDL"), representational state transfer ("REST")-based communications, and so forth. For instance, a user may connect lighting system bridge 104 to a news, weather, and/or sports reporting web service that provides news updates about a selected topic (e.g., a favorite sporting team, celebrity of interest, location of interest, weather updates, etc.). When breaking news occurs, lighting system bridge 104 may operate one or more lighting units 102 to emit various types of lighting effects, such as blinking when the user's favorite team scores a goal.

A user may communicate with one or more lighting units 102 and/or lighting system bridge 104 using a mobile computing device 116. Mobile computing device 116 may come in various forms, such as a smart phone, tablet computer, laptop computer, wearable computing device (e.g., smart glasses, smart watch), and so forth. Mobile computing device may include one or more output devices such as touch screen 118, logic such as one or more processors 120, memory 122 operably coupled to, and storing instructions executable by, logic such as one or more processors 120, and communication interface 124. Communication interface 124 may permit communication by mobile computing device 116 with various other components depicted in FIG. 1, and may employ various technologies, including but not limited to Wi-Fi, BlueTooth, ad hoc (e.g., ZigBee), coded light, NFC, and so forth.

Suppose first sensor 110a is positioned at a first end of a hallway and second sensor 110b is positioned at a second, opposite end of the hallway. When a user enters the first end of the hallway, the user's presence is sensed by first sensor 110a, which raises a sensor event. This sensor event is detected by first lighting unit 102a, which energizes to illuminate the hallway for the user. However, by the time the user is halfway down the hallway, light from first lighting unit 102a may be insufficient to adequately light the user's way. Moreover, the user may not yet be close enough to second sensor 110b for it to sense the user's presence and raise a sensor event to cause second lighting unit 102b to energize. While the user could manually group first lighting unit 102a and second lighting unit 102b together as a group, this may be a tedious process, especially for a non-technically-inclined user.

Accordingly, in various embodiments, one or more components of lighting system 100, such as lighting system bridge 104, may be configured to automatically commission one or more lighting units 102 as a group of lighting units that is configured to be collectively controlled. Lighting system bridge 104 may perform this automatic commissioning in various ways. In some embodiments, lighting system bridge 104 may initiate a predetermined time interval for commissioning a group of two or more lighting units 102 of lighting system 100. During the predetermined time interval, lighting system bridge 104 may receive, e.g., from two or more sensors 110 associated with lighting system 100, indications of two or more sensor events. Lighting system bridge 104 may then commission the group of two or more lighting units 102 to include two or more lighting units 102 of lighting system 100 that are influenced by at least one of the two or more sensor events.

The predetermined time interval used, e.g., by lighting system bridge 104, for commissioning may be selected in various ways. In some embodiments, it may be a user-selected time interval received from, for instance, mobile computing device 116. For example, the user may input a particular time interval, say, thirty seconds or a minute, in which the user will cause one or more sensors 110 to raise sensor events. Once the time interval is started, the user may deliberately active all sensors that will trigger lighting units the user wishes to be members of a group. For instance, the user may operate mobile computing device 116 to start the time interval, and then walk down the hallway, triggering first sensor 110a and second sensor 110b. Lighting unit 102a and lighting unit 102b may then be commissioned as a group, such that triggering either sensor 110a or 110b may cause both lighting units to energize.

In other embodiments, the predetermined time interval may be pre-programmed or otherwise selected to be suitable for the particular circumstances. For example, if lighting units that are potentially to be groups are all in the same luminaire or otherwise very close together, the time interval may be relatively short, e.g., one or two seconds. If the lighting units are scattered throughout a house, on the other hand, then a longer time interval may be warranted.

Groups of lighting units may be commissioned in various ways. In some embodiments, a group address may be assigned to each of the group of two or more lighting units 102, e.g., by lighting system bridge 104. Lighting system bridge 104 may additionally or alternatively map those group addresses to addresses of one or more sensors 110. In some embodiments, lighting system bridge 104 may also group one or more sensors 110 together, particularly where at least one sensor is not associated with (e.g., integral with) a particular lighting unit 102.

In some embodiments, lighting units may be grouped together less definitively. For instance, in some embodiments, lighting units may be correlated to each other, e.g., by similarity, using various forms of correlation or similarity measures. In some such embodiments, a highly-correlated (or similar, or related) group of lighting units may operate collectively if a particular criterion is satisfied (e.g., wall switch A=on), but may operate more independently if that condition is not satisfied or another criterion is satisfied. For instance, lighting units that illuminate path along a front walk, through a front hallway and to a master bedroom may normally operate relatively independently, but may operate as a group (e.g., triggered by a presence sensor in the driveway) when a criterion related to daylight is met, such as time being later than 10:30 pm or a light sensor measuring less than a threshold amount of daylight.

As noted previously, various types of sensor events may be used to group lighting units 102 and/or sensors 110. In some embodiments, one or more sensors 110 and/or lighting units 102 associated with lighting system 100 may be configured to sense a signal from a third party network service/application 114. If two or more lighting units 102 respond to such an event within a predetermined time interval, lighting system bridge 104 may automatically commission those two or more lighting units 102 into a group. For instance, suppose lighting units 102c-f installed in luminaire 108 are each individually configured to flash in response to a network service update indicating that a particular team has scored a goal. When that team scores a goal, third sensor 110c and/or lighting units 102c-f may sense a sensor event within a predetermined time interval (e.g., one second), and may be automatically grouped together in response.

In some embodiments, lighting system bridge 104 may provide, e.g., to mobile computing device 116, data configured to cause mobile computing device 116 to enable output prompting a user to accept, reject, or further modify a proposed group of two or more lighting units. In this manner, potential groups of lighting units 102 may effectively be "proposed" to a user for grouping, rather than simply created without user input or consent. In some embodiments, mobile computing device 116 may render output, e.g., on touch screen 118, that is operable by a user to confirm whether the user accepts or rejects a potential group of lighting units 102 proposed by, e.g., lighting system bridge 104. For example, in response to a number of sensors events being detected within a particular time interval, mobile computing device 116 may render output on touch screen 118 that indicates which lighting units 102 and/or sensors 110 were grouped together, and may ask the user to accept or reject the group, or may allow the user to make modifications.

In some embodiments, other signals besides one or more sensor events may be taken into account when automatically commissioning a group of two or more lighting units 102. In some embodiments, lighting system bridge 104 may additionally or alternatively consider one or more properties of light output by two or more lighting units 102 to determine whether those lighting units 102 are sufficiently similar. For example, lighting system bridge 104 may be configured in some embodiments to group (or suggest to user to group) two or more lighting units 202 that output light having corresponding properties. Light properties may "correspond" if they match or are sufficiently similar to each other (e.g., have lighting property values that are within a predetermined threshold of each other).

Suppose first and second lighting units 102a-b are proposed as a group, but emit light having vastly different lighting properties (e.g., hue, saturation, intensity, color temperature or "CCT," brightness, etc.). Lighting system bridge 104 may opt not to group these lights together, nor to present them as a potential group to a user, based on these differences. On the other hand, suppose first and second lighting units 102a-b emit light having roughly similar (but not necessarily identical) properties, such as hue or saturation values that are within ten percent of each other. In such case, lighting system bridge 104 may group first and second lighting units 102a-b together, or at the very least propose them as a group to a user, e.g., via mobile computing device 116.

Another type of signal that may be used to group lighting units 102 is a variation in observed lighting levels. Suppose first sensor 110a is a light sensor such as a photodiode. Assuming second lighting unit 102b is sufficiently close to first sensor 110a, when second lighting unit 102b is energized, the emitted light may be sensed by first sensor 110a. If this sudden increase in observed lighting satisfies some predetermined threshold, then first lighting unit 102a and second lighting unit 102b may be grouped (or proposed as a potential group). This same technique may be applied to more than two lights. For instance, if multiple lighting units with associated multiple light sensors are installed into a single luminaire, or otherwise in close proximity to each other, those lighting units may be grouped (or proposed as a group) based on observing each other's emitted light.

Figure 2:
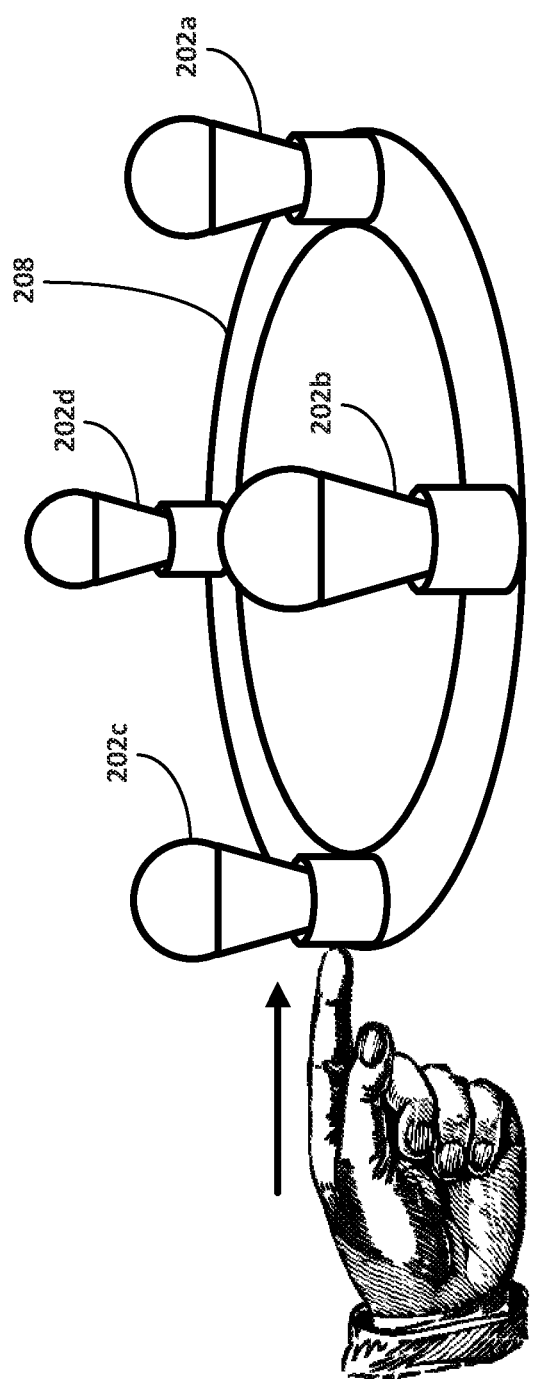
FIG. 2 depicts an example luminaire with lighting units installed, in accordance with various embodiments.

FIG. 2 depicts an example where force applied to, or movement of, a lighting unit or luminaire is used to group lighting units together. In this example, a luminaire 208 has four lighting units, 202a-d, installed. Assume each lighting unit 202 includes an associated motion sensor (e.g., accelerometer, gyroscope, etc.) that is not depicted. When a user applies force to or moves luminaire 208 as shown, that force may be detected virtually simultaneously by each of lighting units 202a-d. A lighting system bridge (not depicted in FIG. 2, see 104 in FIG. 1) may be configured to detect four sensor events raised virtually simultaneously, and at any rate within even a relatively short predetermined time interval, by these lighting units 202a-d. The lighting system bridge may then cause a mobile computing device (not depicted in FIG. 2, see 116 in FIG. 1) to render output allowing a user to accept, reject or modify the proposed group of lighting units 202a-d. If one or more of the lighting units 202a-d are later replaced, when the new lighting unit is installed, assuming it also has a motion-detecting sensor, the same process may be applied again to "regroup" the lighting units.

Figure 3:
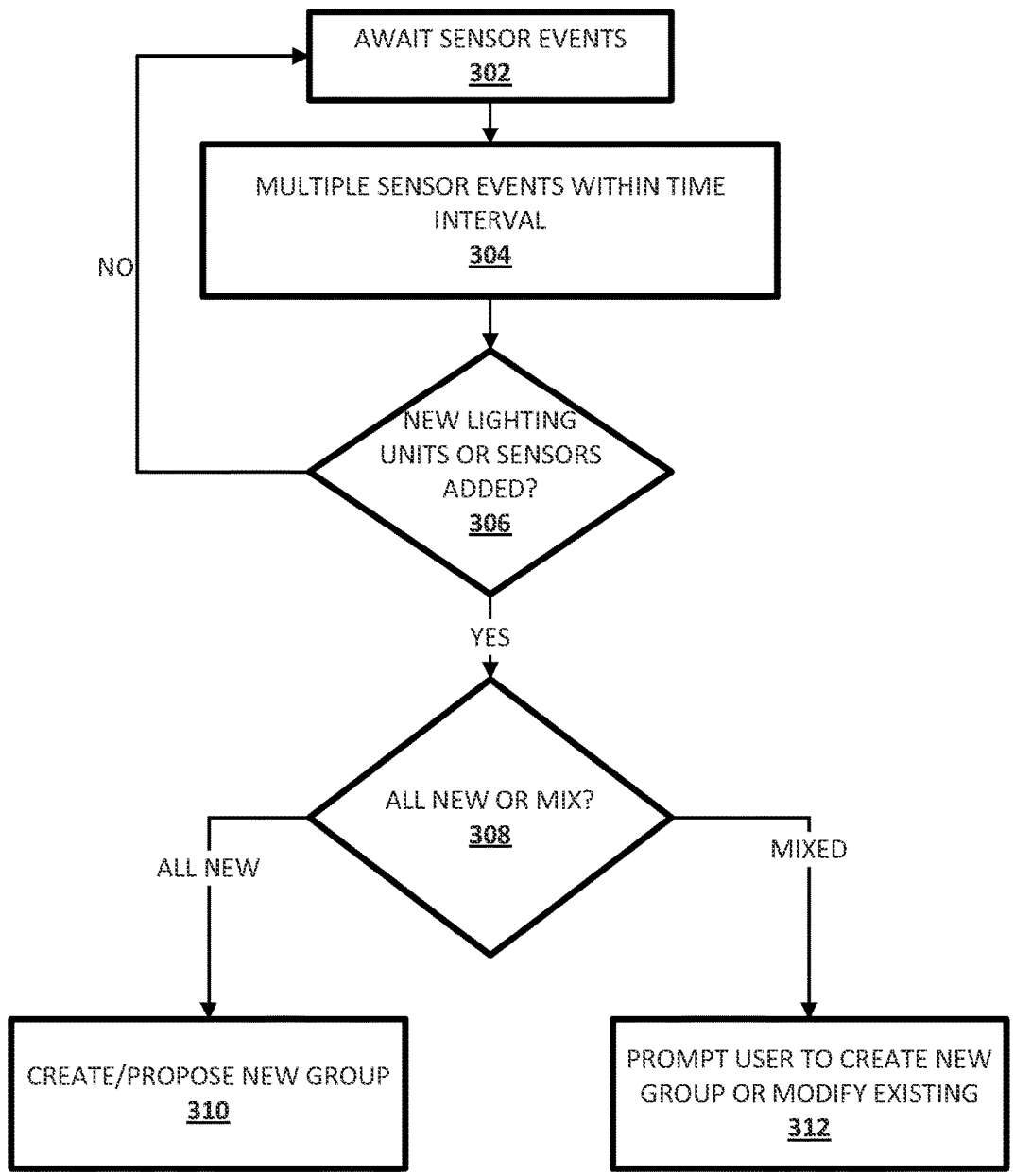
FIG. 3 depicts an example process of commissioning lighting units into groups, in accordance with various embodiments.

FIG. 3 depicts one example process 300 that may be implemented when multiple sensor events are detected within a predetermined time interval. At block 302, sensor events are awaited, e.g., by lighting system bridge 104. At block 304, multiple sensor events are received, e.g., by lighting system bridge 104, within a predetermined time interval. At block 306, it is determined whether any of the sensor events are raised by sensors associated with new lighting units. If not, then process 300 may proceed back to block 302. If there are new lighting units, however, then method proceeds to block 308, at which it is determined whether the detected sensor events correspond to all new lighting units or a mix of new and existing lighting units. If the answer is all new, then process 300 may proceed to block 310 and a new group may be created and/or proposed. If the answer at block 308 is a mix of new and existing lighting units, then process 300 may proceed to block 312, at which a user is prompted to select either creation of a new group of modification of an existing group to include any newly detected lighting units.

Figure 4:
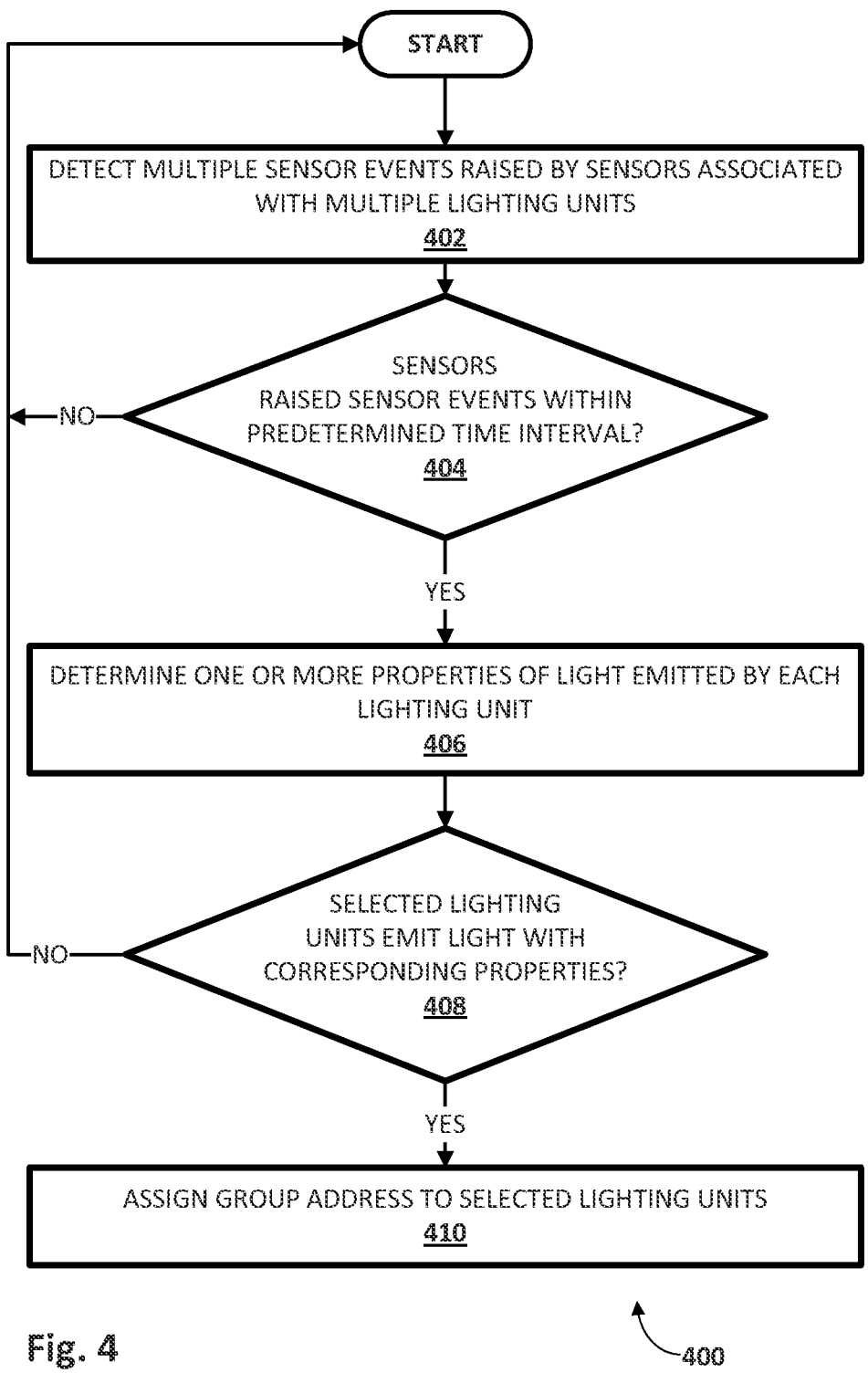
FIG. 4 depicts an example method that may be performed by a network node such as a lighting system controller or bridge, in accordance with various embodiments.

FIG. 4 depicts an example method 400 that may be implemented, e.g., by a network node such as lighting system bridge 104, in accordance with various embodiments. At block 402, the network node may detect multiple sensor events raised by sensors associated with multiple lighting units. At block 404, the network node may determine whether the multiple sensor events detected at block 402 occurred within a predetermined time interval. For example, in some embodiments, the network node may start a timer to begin an iteration of the time interval upon detection of the first sensor event, and may log sensor events for potential lighting unit grouping until expiration of the time interval. In other embodiments, the network node may retroactively examine timestamps associated with the detected network events to determine whether they occurred within a predetermined time interval. If the answer at block 404 is no, then no grouping may occur, and method 400 may proceed back to the beginning.

However, if the answer at block 404 is yes, then method 400 may proceed to block 406. At block 406, the network node may determine one or more properties of light emitted by each lighting unit associated with (e.g., influenced by) a sensor that raised an event that was detected within the predetermined time interval. At block 408, the network node may determine whether the selected lighting units emit light with corresponding (e.g., sufficiently similar, having values within a predetermined threshold of each other, etc.) properties. If the answer is no, then no grouping may occur and method 400 may proceed back to the beginning. However, if the answer is yes, then method 400 may proceed to block 410. At block 410, the network node may group the multiple lighting units associated with the sensors that raised sensor events within the predetermined time interval, e.g., by assigning a group address.

In some embodiments, a user may manually configure a group of lighting units and/or sensors. For example, a user may operate a mobile computing device (e.g., 116 in FIG. 1) to cause an instruction to be issued to a network node acting as a controller for a lighting system, such as lighting system bridge 104, to begin commissioning a group of two or more lighting units from a plurality of lighting units. The user may then trigger energizing of the two or more lighting units she wishes to be part of a group, e.g., by turning them on manually or activating sensors that cause them to energize. When the user is done commissioning the group, she may operate the mobile computing device to cause an instruction to be issued to the network node to cease commissioning the group of two or more lighting units. Once that instruction is received, the network node may stop adding new lighting units to the group and may assign a group address to the two or more energized lighting units.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting system controller to control a plurality of lighting units of a lighting system, comprising:
 a communication interface; and
 logic operably coupled with the communication interface and configured to:
 determine a time interval for automatically grouping two or more lighting units of the plurality of lighting units of the lighting system as a grouping;
 receive, via the communication interface within an iteration of the determined time interval, from two or more sensors associated with the lighting system, indications of two or more sensor events;
 determine one or more properties of light emitted by each of the two or more lighting units associated with at least one of the two or more sensor events received within the same iteration of the determined time interval; and
 automatically group the two or more lighting units as the grouping configured to be collectively controlled based on the indications and light output of each of the two or more lighting units.

2. The lighting system controller of claim 1, wherein the time interval is a user-selected time interval received from a computing device operated by a user.

3. The lighting system controller of claim 1, wherein the logic is further configured to assign a group address to the grouping of two or more lighting units.

4. The lighting system controller of claim 1, wherein at least one of the two or more sensors associated with the lighting system is integral with a particular lighting unit of the lighting system.

5. The lighting system controller of claim 1, wherein at least one of the two or more sensors associated with the lighting system is a presence sensor.

6. The lighting system controller of claim 1, wherein at least one of the two or more sensors associated with the lighting system is an accelerometer or gyroscope configured to detect force applied to, or movement of, a luminaire or lighting unit.

7. The lighting system controller of claim 1, wherein at least one of the two or more sensors associated with the lighting system is a capacitive sensor configured to detect touch of a luminaire.

8. The lighting system controller of claim 1, wherein at least one of the two or more sensors associated with the lighting system is configured to sense a signal from a third party network service.

9. The lighting system controller of claim 8, wherein the signal from a third party network service comprises an event occurring on a social network.

10. The lighting system controller of claim 8, wherein the signal from a third party network service comprises an update from a news service, a weather service, or a sports reporting service.

11. The lighting system controller of claim 1, wherein the two or more lighting units are configured to emit light having lighting property values that fall within a predetermined threshold of each other.

12. The lighting system controller of claim 1, wherein the logic is further configured to provide, via the communication interface to a mobile computing device, data configured to cause the mobile computing device to render output prompting a user to accept, reject, or further modify the grouping of two or more lighting units.

13. A computer-implemented method to control a plurality of lighting units of a lighting system, the method comprising:
 determining, by a network node associated with the lighting system, a time interval for automatically grouping two or more lighting units of the plurality of lighting units of the lighting system as a grouping;
 receiving, via a communication interface within an iteration of the determined time interval, from two or more sensors associated with the lighting system, indications of two or more sensor events;
 determining one or more properties of light emitted by each of the two or more lighting units associated with at least one of the two or more sensor events received within the same iteration of the determined time interval; and
 automatically grouping, by the network node, the two or more lighting units as the grouping configured to be collectively controlled based on the indications and light output of each of the two or more lighting units.

14. The computer-implemented method of claim 13, further comprising assigning, by the network node, a group address to the grouping of two or more lighting units.

15. The computer-implemented method of claim 13, wherein at least one of the two or more sensors associated with the lighting system is integral with a particular lighting unit of the lighting system.

16. The computer-implemented method of claim 13, wherein at least one of the two or more sensors associated with the lighting system is a presence sensor.

17. The computer-implemented method of claim 13, wherein at least one of the two or more sensors associated with the lighting system is an accelerometer or gyroscope.

18. The computer-implemented method of claim 13, wherein at least one of the two or more sensors associated with the lighting system is configured to sense a signal from a third party network service.

19. The computer-implemented method of claim 18, wherein the signal from the third party network service comprises an event occurring on a social network.

20. At least one non-transitory computer-readable medium comprising instructions that, in response to execution of the instructions by a lighting system controller, cause the lighting system controller to perform the method of claim 13.

* * * * *